US008463963B2

(12) United States Patent
Komiyama et al.

(10) Patent No.: US 8,463,963 B2
(45) Date of Patent: Jun. 11, 2013

(54) INPUT/OUTPUT DEVICE HAVING HART COMMUNICATIONS FUNCTIONS

(75) Inventors: Takashi Komiyama, Tokyo (JP); Kentaro Kitahori, Tokyo (JP); Yoshinori Monaka, Tokyo (JP)

(73) Assignee: Azbil Corporation, Tokyo (JP)

(*) Notice: Subject to any disclaimer, the term of this patent is extended or adjusted under 35 U.S.C. 154(b) by 171 days.

(21) Appl. No.: 13/170,425

(22) Filed: Jun. 28, 2011

(65) Prior Publication Data

US 2012/0002734 A1    Jan. 5, 2012

(30) Foreign Application Priority Data

Jun. 30, 2010    (JP) .................................. 2010-149829

(51) Int. Cl.
*G06F 13/12*    (2006.01)
*G06F 13/00*    (2006.01)

(52) U.S. Cl.
USPC ............................... 710/65; 710/33; 709/230

(58) Field of Classification Search
USPC ............... 710/29–30, 33–35, 62–65; 709/230
See application file for complete search history.

(56) References Cited

U.S. PATENT DOCUMENTS

| | | | |
|---|---|---|---|
| 6,449,715 B1 * | 9/2002 | Krivoshein ........................ 713/1 |
| 6,806,847 B2 | 10/2004 | Nixon et al. | |
| 7,103,426 B2 | 9/2006 | Keyes | |
| 2007/0234373 A1 * | 10/2007 | Ozaki et al. .................... 719/324 |
| 2008/0148296 A1 * | 6/2008 | Chen et al. ..................... 719/328 |
| 2009/0168857 A1 * | 7/2009 | Golborne et al. ............. 375/223 |
| 2011/0286542 A1 * | 11/2011 | Shelburne ...................... 375/272 |
| 2012/0004741 A1 * | 1/2012 | Suzuki ............................ 700/12 |
| 2012/0036568 A1 * | 2/2012 | Kodama ........................... 726/7 |
| 2012/0253481 A1 * | 10/2012 | Alley et al. ..................... 700/21 |

FOREIGN PATENT DOCUMENTS

| | | |
|---|---|---|
| JP | 06284474 | 10/1994 |
| JP | 2001-318837 A | 11/2001 |
| JP | 2003-186503 A | 7/2003 |
| JP | 2009064451 A | 3/2009 |
| JP | 2010113725 A | 5/2010 |

OTHER PUBLICATIONS

Korean Office Action, dated Sep. 21, 2012, which issued during the prosecution of Korean Patent Application No. 10-2011-0037382.

* cited by examiner

*Primary Examiner* — Christopher Shin
(74) *Attorney, Agent, or Firm* — Troutman Sanders LLP

(57) ABSTRACT

Channels, which are assigned to each individual lower-level device that are the input/output destinations for HART communications signals that are produced through superimposing, onto a 4 to 20 mA DC signal, digital signals that have been converted into 1200 Hz and 2200 Hz frequency signals; a first controlling portion for controlling communications with a higher-level device; and HART communications portions, provided for each individual channel, for extracting frequency signals from the HART communications signals received through the channels, and for sending to the controlling portion digital signals corresponding to the frequency signals, are provided; where the first controlling portion sends, to the higher-level device, the digital signals received from the individual HART communications portions.

4 Claims, 4 Drawing Sheets

INPUT/OUTPUT DEVICE HAVING HART COMMUNICATIONS FUNCTIONS

CROSS REFERENCE TO RELATED APPLICATIONS

The present application claims priority under 35 U.S.C. §119 to Japanese Patent Application No. 2010-149829, filed Jun. 30, 2010, which is incorporated herein by reference.

FIELD OF TECHNOLOGY

The present invention relates to an input/output device having HART communications functions.

BACKGROUND OF THE INVENTION

In the field of manufacturing process control, various types of field devices having communication functions (for example, sensors, valves, and the like) are installed in the plants, to control the various manufacturing processes in the plants through reading into a system signals that are transmitted from the field devices. As systems that control manufacturing processes there are those that control, for example, the degree of opening of valves based on flow rates, temperatures, pressures, and the like, read in from sensors. In recent years, devices equipped with HART (Highway Addressable Remote Transducer) communication functions have been used as field devices connected to this type of process control system. HART communication-compatible devices perform input and output of signals (hereinafter termed "HART communication signals") that are produced by superimposing digital signals, which have been converted into frequency signals of 1200 Hz or 2200 Hz, onto DC signals of between 4 and 20 mA, that indicate the measured values or control values. That is, HART communication-compatible devices are able to apply and exchange various types of information, in addition to measured values and control values. Systems that use HART communication-compatible devices are disclosed in Japanese Unexamined Patent Application Publication 2003-186503 ("JP '503") in Japanese Patent 4129715 ("JP '715"), below.

In the systems in each of the aforementioned JP '503, and JP '715, HART communications signals that are outputted from a plurality of HART communications-compatible devices are selected sequentially by a multiplexer and sent to higher-level devices. HART communications require some time for each individual communication, when the communications are performed sequentially using a multiplexer, because the communication typically is performed at the low speed of 1200 bps. This produces processing delay in HART communications, producing delays in the systems.

The present invention was created in order to solve the problems in the conventional technology described above, and the object thereof is to provide an input/output device, having HART communications functions, able to eliminate the processing delay through HART communications, in order to reduce system lag.

An input/output device having HART communications functions according to the present invention includes channels that are allocated to each input/output destination of HART communications signals that are produced through superimposing a second signal onto a first signal; a controlling portion for controlling communications performed with a higher-level device; and a HART communications portion, provided for each channel, for extracting the second signal from the HART communications signal received through the channel, and sending, to the controlling portion, a digital signal corresponding to the second signal, wherein the controlling portion sends the digital signals, sent by the individual HART communications portions, to the higher-level device.

The use of this structure makes it possible to process, in individual HART communications portions that are provided for each of the channels, the HART communication signals that are sent from, for example, various types of field devices, and then to send the signal after processing to a higher-level device through the controlling portion. Doing so makes it possible to perform, simultaneously and in parallel for each of the channels, the processes in the HART communications portions that require processing time.

The controlling portion, when a request signal has been received from the higher-level device, may send the request signal to the HART communications portion corresponding to the request signal, and the HART communications portion may send, through the channel, a HART communication signal that includes the request signal to a lower-level device that is the input/output destination.

The HART communications portion may include a separating/superimposing portion for separating the HART communications signal into the first signal and the second signal, or for superimposing the second signal onto the first signal to produce the HART communications signal; a modulating/demodulating portion for performing conversion processes on the second signal and the digital signal; and a second controlling portion for controlling the transmission and reception of the digital signal that is performed between the modulating/demodulating portion and the controlling portion.

The first signal may be a 4-20 mA DC signal; and the second signal may be a frequency signal wherein a digital signal has been converted.

The present invention enables the provision of an input/output device having HART communications functions, able to eliminate the processing delay through HART communications, in order to reduce system lag.

DETAILED DESCRIPTION OF THE PRESENT INVENTION

Examples of the present invention are explained below in reference to the drawings. However, the example explained below is no more than an illustration, and does not exclude various modifications and applications to technologies not explicated below. That is, the present invention can be embodied in a variety of modified forms, in the scope that does not deviate from the spirit and intent thereof.

Figure 1:
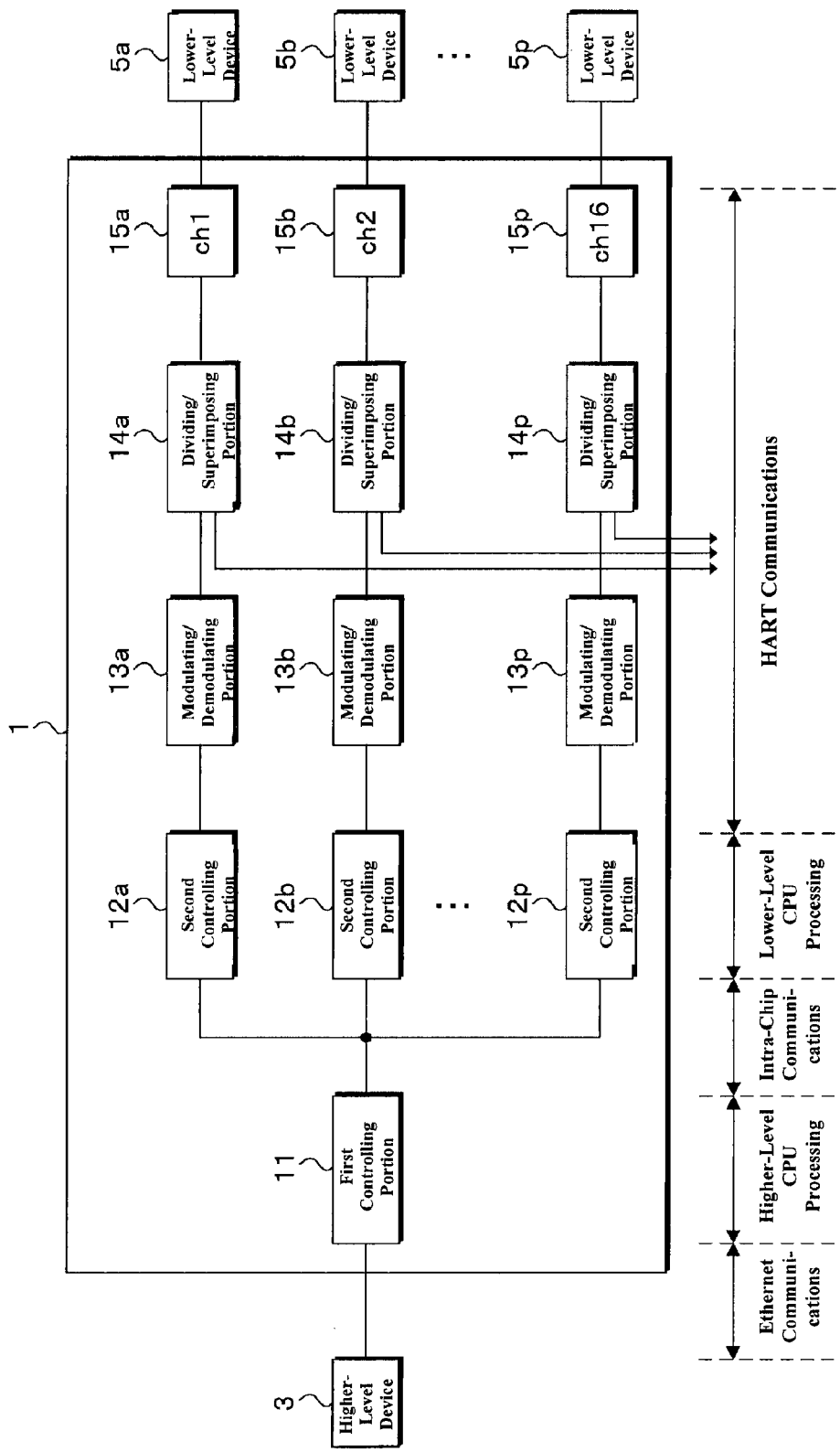
FIG. 1 is a diagram illustrating a configuration of a HART-I/O according to an example.

The structure of an input/output device having the HART communications functions (hereinafter termed the "HART-I/O") according to the present embodiment is described first in reference to FIG. 1. As illustrated in FIG. 1, the HART I/O 1 comprises a first controlling portion 11, second controlling portions 12a through 12p, modulating/demodulating portions 13a through 13p, separating/superimposing portions 14a through 14p, and channels 15a through 15p.

While in the present example, the explanation was for a HART-I/O having 16 channels worth of ports, there is no limitation to this number of channels (ports). Note that when it comes to the second controlling portions 12a through 12p, the modulating/demodulating portions 13a through 13p, the separating/superimposing portions 14a through 14p, the channels 15a through 15p, and the lower-level devices 5a through 5p, if there is no particular need to make a distinction, these will be termed second controlling portions 12, modulating/demodulating portions 13, separating/superimposing portions 14, channels 15, and lower-level devices 5, respectively.

The lower-level devices 5 are devices that are on the lower-level side, to which are assigned the individual channels 15 of the HART-I/O. As the slave devices 5, there are, for example, field devices equipped with the HART communications functions (hereinafter termed "HART communications-compatible devices"). The HART communications-compatible devices send and receive HART communications signals. HART communications signals are signals that are produced by superimposing, onto 4-20 mA DC signals, digital signals that are converted into frequency signals of 1200 Hz and 2200 Hz.

The DC signal is a signal that has a value that is one variable that is transmitted for each HART communications-compatible device. The variable value is a measurement value such as, for example, a flow rate, a pressure, or a temperature, or a control value such as a degree of valve opening. The digital signals are signals indicating various types of data that can be collected with in the HART communications-compatible devices. As the various types of data there are, for example, process data in the HART communications-compatible device, or failure data for hardware included in the HART communications-compatible device. Note that measurement values and control values of the HART communications-compatible device may also be included in the various types of data.

The second controlling portions 12, the modulating/demodulating portions 13, and the separating/superimposing portions 14 are provided for each of the channels 15, where these structure the "HART communications portions." That is, in the present example, the 16 HART communications portions are connected in parallel to the lower-level side of the first controlling portion 11. The HART communications portions extract the frequency signals from the HART communications signals received through the channels 15, for example, and send, to the first controlling portion 11, digital signals corresponding to the frequency signals.

The separating/superimposing portion 14 has, although not illustrated, a separating portion for separating the HART communications signal into the DC signal and the frequency signal and a superimposing portion for generating a HART communications signal by superimposing the frequency signal onto the DC signal. The separating/superimposing portion 14 exchanges frequency signals with the modulating/demodulating portion 13, and sends a DC signal to an external device (such as a controller), not shown.

The modulating/demodulating portion 13 is physically structured from, for example, a HART modem. The modulating/demodulating unit 13 performs the conversion processing between frequency signals and digital signals. The conversion process is a process wherein digital signals that are expressed as 0 and 1 are converted into frequency signals that are expressed as 2200 Hz signals and 1200 Hz signals. Additionally, they are also the processes for converting the frequency signals, which are expressed as 2200 Hz signals and 1200 Hz signals, into digital signals that are expressed as 0 and 1.

The second controlling portion 12 is physically structured as, for example, a CPU and a peripheral device. The second controlling portion 12 controls the transmission and reception of signals performed between the HART communications portion and the first controlling portion. A dedicated bus (for example, 100 Kbps) connects between the second controlling portion 12 and the first controlling portion 11.

The first controlling portion Ill is physically structured from, for example, a CPU and a peripheral device. The first controlling portion 11 controls the communications are perfumed with the higher-level device 3, which is a device at a higher level. The higher-level device 3 is, for example, a hub that is included in a monitoring system for monitoring the statuses, and the like, of the HART communications-compatible devices. The HART I/O 1 and the hub are connected by an Ethernet™ standard communications cable (at, for example, 100 Mbps).

An equipment monitoring portion (not shown) that is included in the monitoring system receives, through the hub, digital signals outputted from the HART I/O 1. The equipment monitoring system, based on the digital signals received, performs diagnoses of the state of execution of processes in the HART communications-compatible devices, the states of failures in the hardware that is included in the HART communications-compatible devices, times wherein maintenance and repair are required in the HART communications-compatible devices, and the like. The equipment monitoring portion displays the diagnostic results, and the like, on a monitor. Doing so enables the operator to monitor the HART communications-compatible devices.

The communications performed between the higher-level device and the HART I/O will be explained next in reference to FIG. 2. Here, for convenience in explanation, the explanation will be limited to one cycle worth of communication performed between the higher-level device 3 and the lower-level device 5a that is assigned to channel 15a "ch 1" of the 16 channels.

Figure 2:
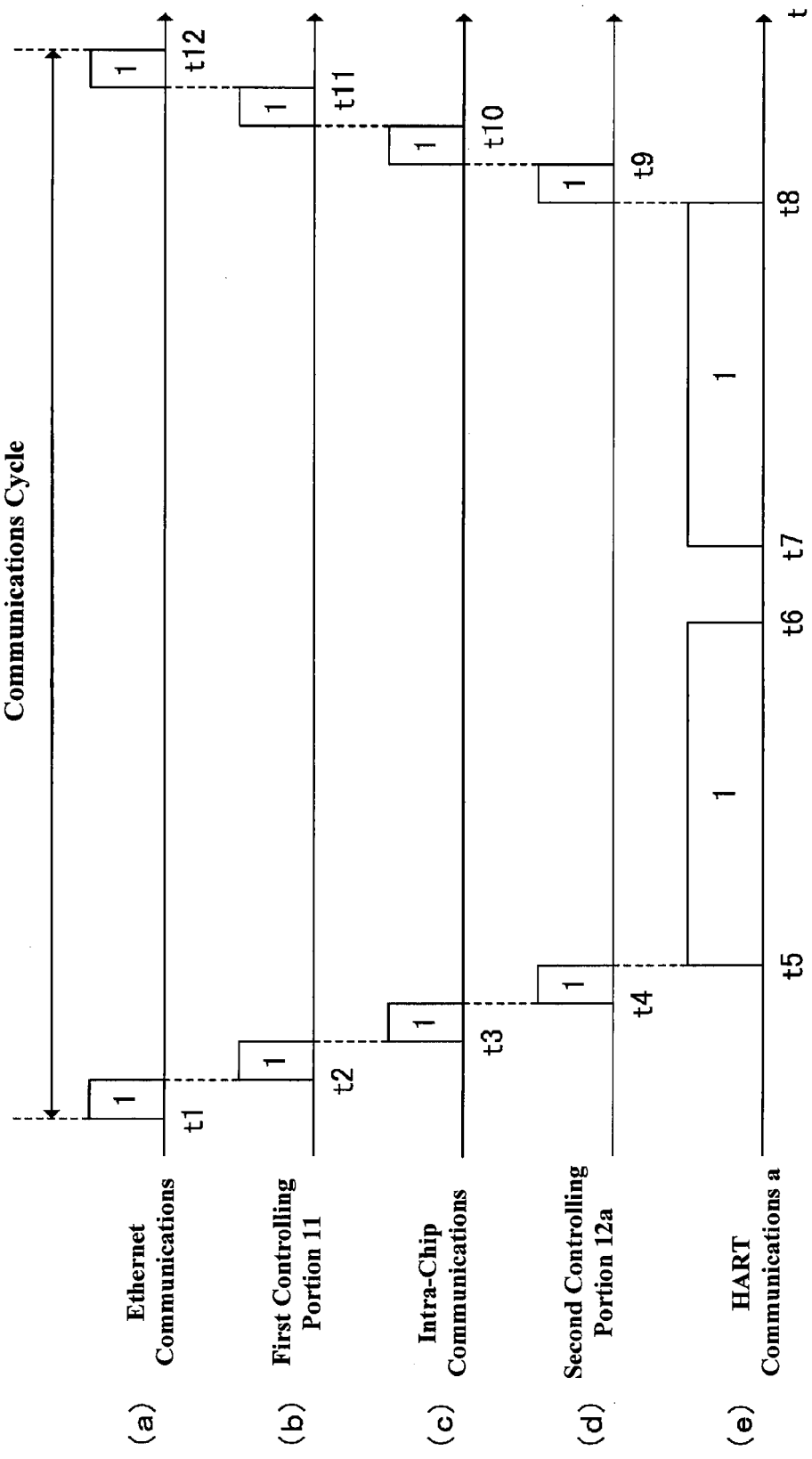
FIG. 2 is a timing chart illustrating an example of communication performed between a higher-level device and the HART I/O.

Each of the horizontal axes in FIG. 2 represents time. FIG. 2 (a) is a chart illustrating the state of communications between the higher-level device 3 and the first controlling portion 11. FIG. 2 (b) is a chart illustrating the state of processing in the first controlling portion 11. FIG. 2 (c) is a chart illustrating the state of communication between the first controlling portion 11 and the second controlling portion 12a. FIG. 2 (d) is a chart illustrating the state of processing in the second controlling portion 12a. The FIG. 2 (e) is a chart illustrating the state of communications/processing between the second controlling portion 12a and the channel 15a. The "1" shown in each chart in FIG. 2 indicates schematically the process for "ch 1."

Initially, the higher-level device 3 issues a request signal to the lower-level device 5a, at which time the request signal is sent from the higher-level device 3 to the first controlling portion 11 over the interval from timestamp t1 to timestamp t2 (Ethernet™ communication).

Following this, over the interval from timestamp t2 to timestamp t3, processing is performed in the first controlling portion 11, and then, in the interval from timestamp t3 to timestamp t4, a request signal is sent from the first controlling portion 11 to the second controlling portion 12a (intra-chip communication).

Following this, processing is performed in the second controlling portion 12a over the interval from timestamp t4 to timestamp t5, and, during the interval from timestamp t5 to timestamp t6, a HART communications signal that has been generated by the modulating/demodulating portion 13a and the separating/superimposing portion 14a based on the request signal is sent to the lower-level device 5a through the channel 15a "ch 1" (HART communications a).

Following this, a response from the lower-level device 5a is awaited over the interval from timestamp t6 to timestamp t7, where, during timestamp t7 to timestamp t8, the separating/superimposing portion 14a and the modulating/demodulating portion 13a extract a digital signal based on a HART communications signal received from the lower-level device 5a through the channel 15a "ch 1," and send the extracted digital signal to the second controlling portion 12a (HART communications a).

Following this, during the interval from timestamp t8 to timestamp t9, processing is performed in the second controlling portion 12a, and then, during the interval from timestamp t9 to timestamp t10, a digital signal is sent from the second controlling portion 12a to the first controlling portion 11 (intra-chip communication).

Following this, in the interval from timestamp t10 to timestamp t11, processing is performed in the first controlling portion 11, and then, in the interval from timestamp t11 to timestamp t12, a digital signal is sent from the first controlling portion 11 to the higher-level device 3 (Ethernet™ communications).

Figure 3:
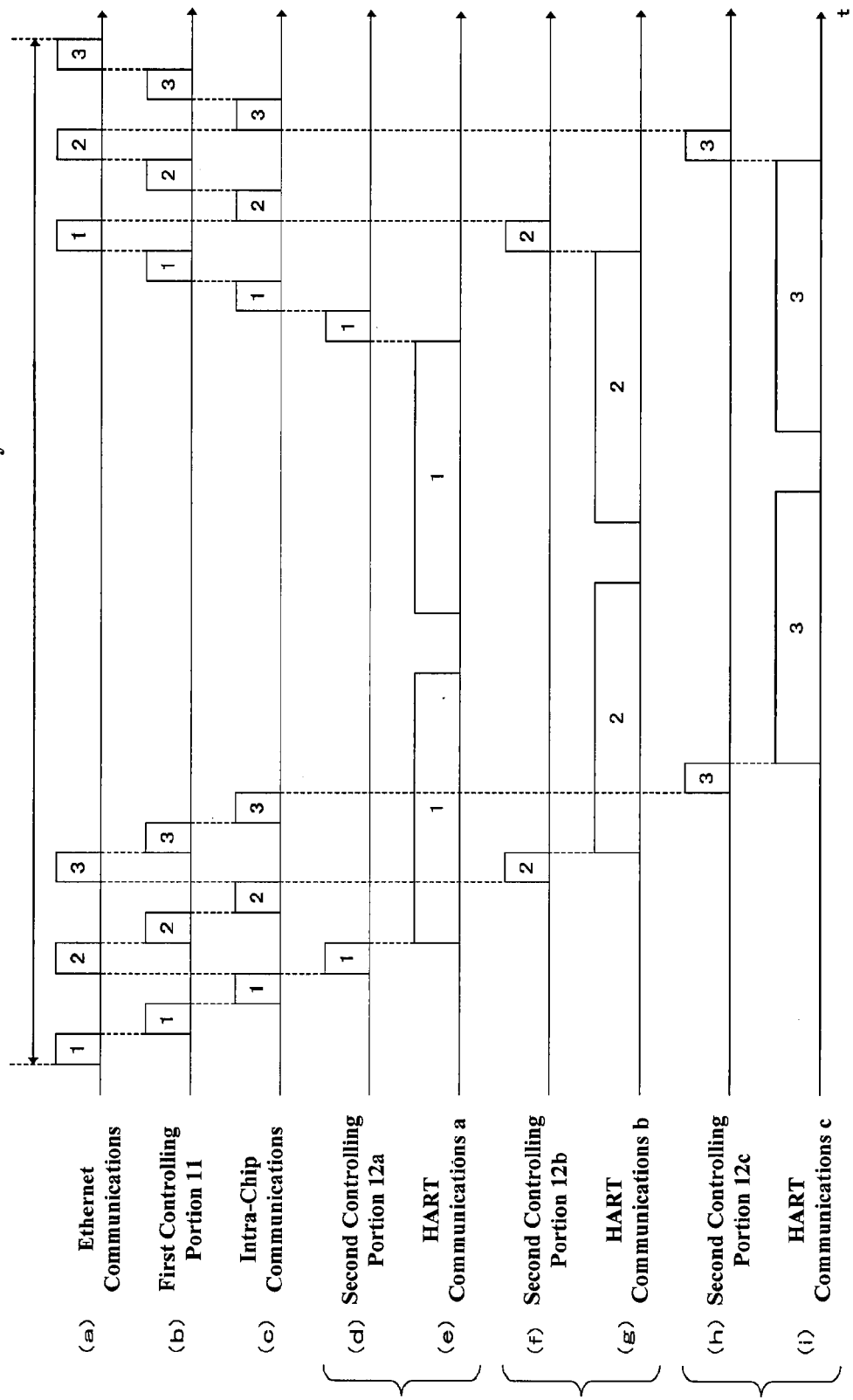
FIG. 3 is a timing chart illustrating an example of communication performed between a higher-level device and the HART I/O.

The case of communications using a plurality of channels will be explained next in reference to FIG. 3. Here, for convenience in the explanation, the case wherein communications are performed using three channels will be explained. FIG. 3 is a timing chart for one cycle worth of communications performed with the lower-level device 5a through the lower-level device 5c, which are assigned to general 15a "ch 1" through channel 15c "ch 3," of the 16 channels.

Each of the horizontal axes in FIG. 3 indicates time. FIG. 3 (a) is a chart illustrating the state of communications between the higher-level device 3 and the first controlling portion 11. FIG. 3 (b) is a chart illustrating the state of processing in the first controlling portion 11. FIG. 3 (c) is a chart illustrating the state of communication between the first controlling portion 11 and the second controlling portions 12a to 12c, FIG. 3 (d) is a chart illustrating the state of processing in the second controlling portion 12a. The FIG. 3 (e) is a chart illustrating the state of communications/processing between the second controlling portion 12a and the channel 15a. FIG. 3 (f) is a chart illustrating the state of processing in the second controlling portion 12b. The FIG. 3 (g) is a chart illustrating the state of communications/processing between the second controlling portion 12b and the channel 15b. FIG. 3 (h) is a chart illustrating the state of processing in the second controlling portion 12c. The FIG. 3 (i) is a chart illustrating the state of communications/processing between the second controlling portion 12c and the channel 15c. The "1" through "3" shown in each chart in FIG. 3 indicate schematically the process for "ch 1" through "ch 3," respectively.

Here the various communications performed between the lower-level devices 5a through 5c had the higher-level device 3, illustrated in FIG. 3, are formed in the same manner as the communications between the lower-level device 5a and the higher-level device 3 described above (referencing FIG. 2), and thus explanations thereof will be omitted.

As illustrated in FIG. 3, the various HART communications a through c that require processing time are performed in parallel and simultaneously, without waiting time.

The HART-I/O 1 according to the example set forth above enables HART communications signals that are sent from HART communications-compatible devices, which are the various lower-level devices 5, to each be processed by respective HART communications portions that are provided for each of the channels 15, and enables the digital signals after processing to be sent through the first controlling portion 11 to the higher-level device 3 of the monitoring system on the higher-level side. Doing so makes it possible to perform the processing in the HART communications portions, which requires processing time, to be performed simultaneously and in parallel for each of the channels 15. As a result, this enables the processing lag due to HART communications to be eliminated, enabling a reduction in system delay.

Figure 4:
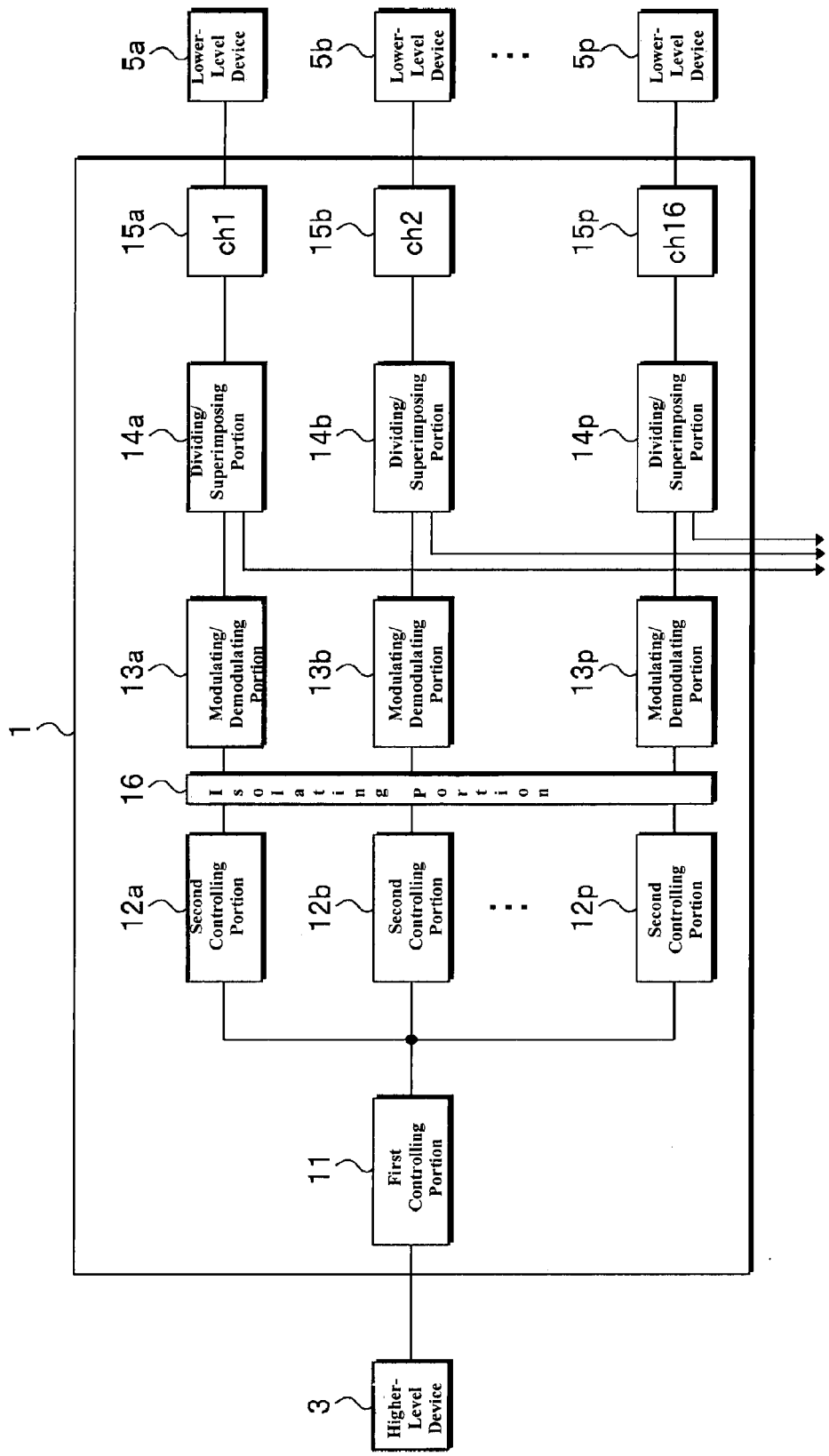
FIG. 4 is a diagram illustrating a configuration of an isolation-type HART-I/O according to another example.

Note that the HART-I/O in the example set forth above may instead be structured as an isolation-type HART-I/O. FIG. 4 illustrates the structure of the isolation-type HART-I/O. The isolation-type HART-I/O 1 illustrated in FIG. 4 differs from the HART-I/O 1 in the example set forth above in the point that an isolating portion 16 is added between the second controlling portion 12 and the modulating/demodulating portion 13. The isolating portion 16 isolates the digital signals and power supply, for each HART communications portion, through the use of for example, a photocoupler or a transformer. The provision of the isolating portion 16 makes it possible to eliminate the effects of differences in ground levels between channels, static electricity, and the like.

Additionally, the HART-I/O in the example set forth above may be provided on a semiconductor substrate such as, for example, a daughterboard. Doing so enables the easy achievement of the various functions of the HART-I/O in the example set forth above as optional functions of an existing I/O unit, by installing this daughterboard into an existing I/O unit that performs the input/output of, for example, DC signals at between 4 and 20 mA.

Additionally, while in the HART-I/O in the example set forth above the explanation was for a case of the lower-level devices 5 responding to requests from the higher-level device 3, the form of communication is not limited thereto, but rather may be applied in a variety of forms. For example, the present invention may be applied also in a form wherein a HART communications signal is sent at regular intervals from a HART communications-compatible device that is a lower-level device 5.

Additionally, while in the HART-I/O in the example set forth above the signals received from the individual HART communications portions were sent individually when sending signals in the Ethernet™ communications from the first controlling portion 11 to the higher-level device 5, instead the signals received from the individual HART communications portions may be sent as a batch for each communications interval.

The invention claimed is:
1. An input/output device having HART communications functions comprising:
   channels that are allocated to each input/output destination of HART communications signals that are produced through superimposing a second signal onto a first signal;
   a controlling portion controlling communications performed with a higher-level device; and
   a HART communications portion, provided for each channel, for extracting the second signal from the HART communications signal received through the channel, and sending, to the controlling portion, a digital signal corresponding to the second signal, wherein the controlling portion sends the digital signals, sent by the individual HART communications portions, to the higher-level device.

2. The input/output device having HART communications functions as set forth in claim 1, wherein:

the controlling portion, when a request signal has been received from the higher-level device, may send the request signal to the HART communications portion corresponding to the request signal; and the HART communications portion sends, through the channel, a HART communication signal that includes the request signal to a lower-level device that is the input/output destination.

3. The input/output device having HART communications functions as set forth in claim 1, wherein the HART communications portion comprises:

a separating/superimposing portion for separating the HART communications signal into the first signal and the second signal, or for superimposing the second signal onto the first signal to produce the HART communications signal;

a modulating/demodulating portion for performing conversion processes on the second signal and the digital signal; and a second controlling portion for controlling the transmission and reception of the digital signal that is performed between the modulating/demodulating portion and the controlling portion.

4. The input/output device having HART communications functions as set forth in claim 1, wherein the first signal is a 4-20 mA DC signal, and the second signal is a frequency signal wherein a digital signal has been converted.

\* \* \* \* \*